Figure 1:
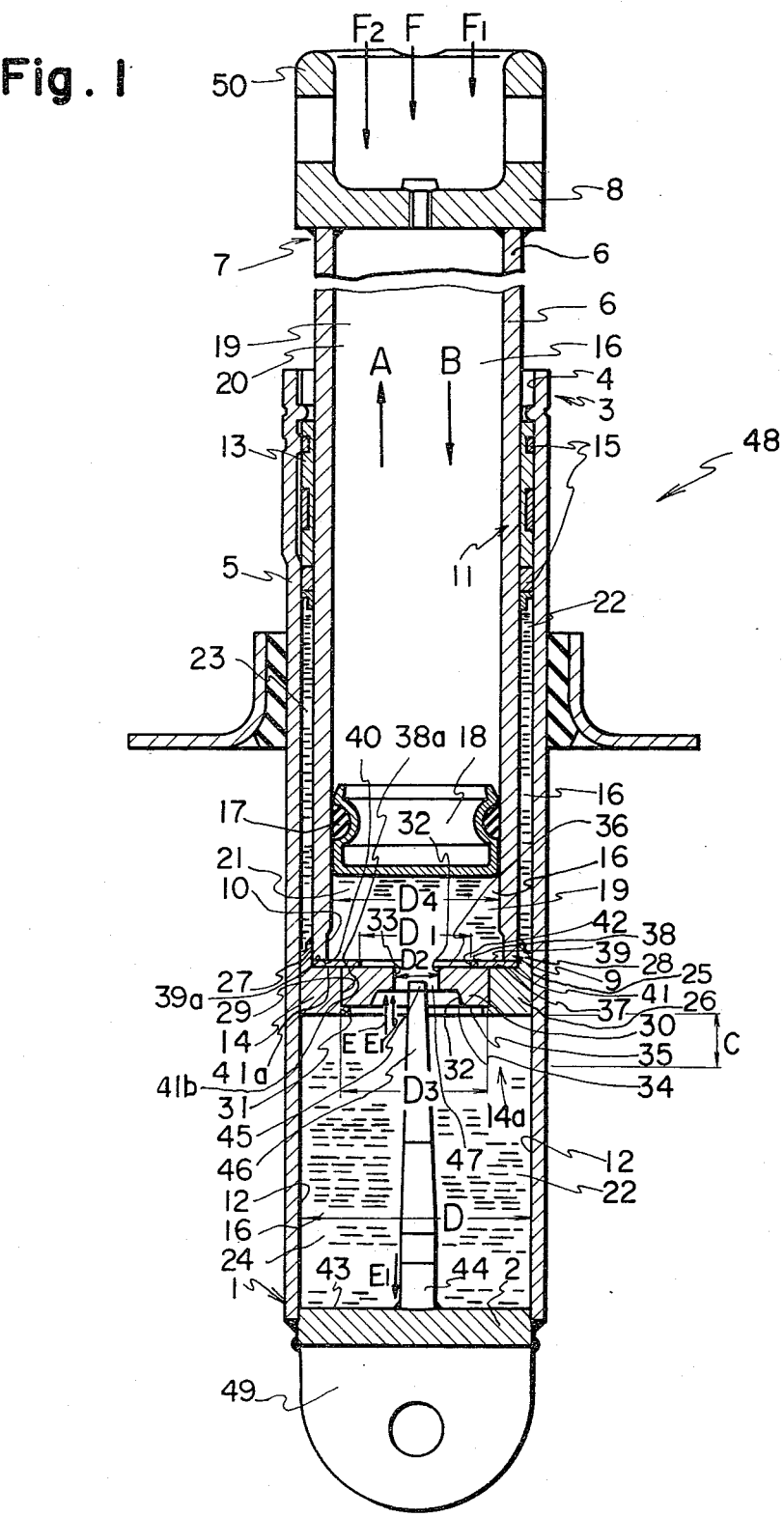

United States Patent [19]

Ashiba

[11] 4,437,548

[45] Mar. 20, 1984

[54] SHOCK ABSORBER

[75] Inventor: Masahiro Ashiba, Kanagawa, Japan

[73] Assignee: Tokico Ltd., Kawasaki, Japan

[21] Appl. No.: 503,650

[22] Filed: Jun. 16, 1983

Related U.S. Application Data

[63] Continuation of Ser. No. 240,791, Mar. 5, 1981, abandoned.

[30] Foreign Application Priority Data

Mar. 12, 1980 [JP] Japan .......................... 55-32192[U]

[51] Int. Cl.³ .............................................. F16F 9/342
[52] U.S. Cl. ...................................... 188/289; 137/68 R;
138/45; 188/280; 188/314; 188/317; 267/8 A;
267/64.26; 267/127; 267/136; 293/134
[58] Field of Search ............... 188/280, 289, 297, 311,
188/314, 317, 322.22; 267/8 A, 64.26, 124, 127,
136, 137, 139; 293/134; 138/44, 45; 251/360;
137/68 R

[56] References Cited

U.S. PATENT DOCUMENTS

| 2,778,627 | 1/1957 | Sands ................................. 267/127 |
| 2,847,074 | 8/1958 | Maly et al. ..................... 137/68 R X |
| 3,599,713 | 8/1971 | Jenkins ............................ 137/68 R |
| 3,774,895 | 11/1973 | Willich et al. ....................... 267/136 |
| 3,834,581 | 9/1974 | Solter et al. .................. 137/68 R X |
| 3,968,862 | 7/1976 | Gorges et al. ................. 267/139 X |
| 3,991,863 | 11/1976 | Lee ...................................... 188/289 |
| 4,126,212 | 11/1978 | Crawley ............................. 188/317 |

FOREIGN PATENT DOCUMENTS

| 1096528 | 2/1955 | France .............................. 188/314 |
| 49-31545 | 4/1974 | Japan . |
| 50-142985 | 11/1975 | Japan . |
| 837494 | 6/1960 | United Kingdom ............. 267/64.26 |

*Primary Examiner*—George E. A. Halvosa

[57] ABSTRACT

A shock absorber is disclosed having an outer cylinder closed at one end thereof, a hollow inner cylinder closed at one end and opened at an another end thereof, the open end being inserted in the outer cylinder, a guide member for guiding the inner cylinder slidably in the outer cylinder, a member for generating a damping force, the damping force generating member being connected to the open end of the inner cylinder, and having an orifice for throttling flow of hydraulic fluid from a chamber in the outer cylinder to a chamber in the inner cylinder, the orifice being in a central portion of the inner cylinder, and a plate-like stop provided between the inner cylinder and the damping force generating member for retaining the damping force generating member against the damping force within a predetermined range, the stop having an aperture greater than the orifice.

21 Claims, 2 Drawing Figures

SHOCK ABSORBER

This application is a continuation of United States application Ser. No. 240,791 filed Nov. 5, 1981, now abandoned.

This invention concerns a shock absorber and, more specifically, it relates to a shock absorber, for example, mounted between the bumper and the chassis of a vehicle such as a passenger car and a truck for moderating the impact shock applied to the bumper and for transmitting the damped shock to the chassis upon collision of the vehicle.

Such a shock absorber has been known that comprises an outer cylinder, an inner cylinder having at its one end an annular guide member slidable within the outer cylinder, a damping force generating member fitted in the penetrating hole of the guide member and having in its central portion an orifice for communicating the hydraulic fluid chamber in the outer cylinder with the hydraulic fluid chamber in the inner cylinder, a metering pin capable of being inserted into the orifice for controlling the size of flow passage of the hydraulic fluid between the hydraulic fluid chambers, and shear pins adapted to retain the damping force generation member to the guide member usually and to be sheared, upon exertion of large impact shock, so as to allow the damping force generating member to be detached from the guide member thereby permitting the hydraulic fluid to flow through the penetrating hole in the guide member and moderating the transmitted impact shock.

However, in manufacturing conventional shock absorber using such shear pins, both of the guide member and the damping force generating member have to be drilled from the outer circumference of the guide member in order to form bores for receiving the shear pins in a state where the damping force generating member is fitted in the annular guide member, and workability of the drilling is very poor.

There is fear that the guide member or the damping force generating member may be cracked or partially broken in the drilling operation.

In addition, there is fear that the fairly large strain may be produced in the shear pins or that the shear pins may have defects or flaws when the shears pins are pressed into the bores.

Therefore there is fear that the shear pins may not be sheared off by the predetermined or designed magnitude of impact shock or that the shear pins may be sheared off or broken by the impact shock much less than the predetermined magnitude.

The object of this invention is to provide a shock absorber capable of reliably moderating the impact shock by surely enlarging the flow passage of hydraulic fluid upon application of impact shock exceeding a predetermined magnitude.

The foregoing object of this invention can be attained by a shock absorber comprising an outer cylinder closed at one end thereof, a hollow inner cylinder closed at one end and opened at an another end thereof, the open end being inserted in the outer cylinder, a guide member for guiding the inner cylinder slidably in the outer cylinder, a member for generating a damping force, the damping force generating member being connected to the open end of the inner cylinder, and having an orifice for throttling flow of hydraulic fluid from a chamber in the outer cylinder to a chamber in the inner cylinder, the orifice being in a central portion of the inner cylinder, and a plate-like stop provided between the inner cylinder and the damping force generating member for retaining the damping force generating member against a force corresponding to the damping force within a predetermined range, the stop having an aperture greater than the orifice.

Figure 2:
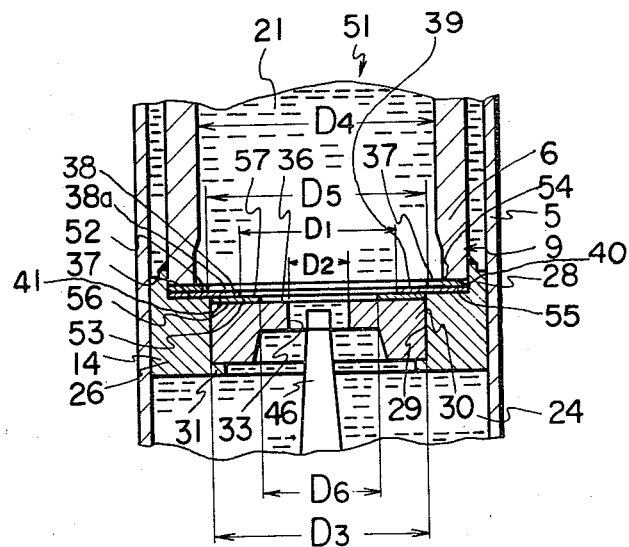

This invention is to be described in more detail referring to the accompanying drawings, by which the foregoing and other objects, as well as the features of this invention will made clearer in which:

FIG. 1 is a longitudinal sectional view of a preferred embodiment of the shock absorber according to this invention; and FIG. 2 is a longitudinal sectional view of a part of a modified embodiment of the shock absorber according to this invention.

An inner cylinder 6 is inserted in an outer cylinder 5 having one end 1 closed by a cap member 2 and an another end 3 formed with an opening 4. The inner cylinder 6 is closed at one end 7 with a cap member 8 and has, at an another end 9, an opening 10. A sliding member 13 and a guide member 14 are secured to the outer circumferences at the body portion 11 and at the open end 9 of the inner cylinder 6 respectively. Both members 13, 14 are slidable in the directions A, B along the inner circumferential surface 12 of the outer cylinder 5 and serve for guiding the inner cylinder 6 in the directions A, B. The guide member 13 has sealing rings 15 at the outer circumference thereof, which seal a chamber 16 surrounded by the outer and the inner cylinders 5, 6 from the outside. A free piston 18 mounted with sealing rings 17 at its outer circumference is fitted slidably in the directions A, B within the inner cylinder 6 to separate the chamber 19 defined by the inner cylinder 6 into a gas chamber 20 and a hydraulic fluid chamber 21. The gas chamber 20 is filled with inert gas such as nitrogen gas and the fluid chamber 21 is filled with hydraulic fluid such as oil. The chamber 22 in the outer cylinder 5 communicating the fluid chamber 21 is also filled with hydraulic fluid such as oil. Although the guide member 14 may be mounted at its outer circumference with sealing rings so as to completely divide the chamber 22 by the guide member 14 into a chamber 23 between the members 13, 14 and a hydraulic fluid chamber 24 between the guide member 14 and the cap member 2, it is not necessary to completely divide the chamber 23 and the chamber 24 since the volume of the chamber 23 is always kept constant. Further, in the case where the guide member 14 is mounted with a sealing ring to seal the chamber 24 hermetically from the chamber 23, the chamber 23 may be communicated with atmospheric air and the sealing rings 15 can be omitted.

The guide member 14 comprises an annular main body 26 slidingly contacted at its outer circumferential surface 25 to the inner circumference 12 of the outer cylinder 5, an annular outer periphery 28 extended from the vicinity of the outer circumferential periphery of the main body 26 along the axial direction of the inner cylinder 6 and engaged with the outer circumferential surface 27 of the open end 9 of the inner cylinder 6, and an annular protrusion 31 protruded into the axial penetrating hole 29 of the annular main body 26 so as to prevent the displacement, in the direction B, of an annular member 30 for generating a damping force with respect to the annular main body 26 which is fitted in the hole 29.

In the case where the shock absorber is applied to lifts or the like with less vibrations, the protrusion 31 may be omitted, provided that the annular member 30 is well engaged tightly with the guide member 14 frictionally. Instead of providing the protrusion 31, the hole 29 may be formed as a tapered aperture in which the diameter is decreased toward the end 1, while the diameter of the annular member 30 being decreased toward the end 1 so as to just fit it to the tapered aperture 29. The central aperture 32 formed in the annular member 30 for the communication of the hydraulic fluid chambers 21 and 24 comprises an orifice 33 throttling flow of hydraulic fluid between the chambers 21, 24 therethrough so as to generate the damping force and an aperture 34 diverged gradually from the orifice 33 to the chamber 24 so as to guide the hydraulic fluid in the chamber 24 to the orifice 33.

The annular member 30 is supported by the protrusion 31 at the outer periphery of an annular end face 35 facing the chamber 24 and the other annular end face 36 is substantially coplanar with an annular end face 37 of the main body 26 of the guide member 14 facing the chamber 21. A plate-like annular stop 38 made of a flat annular plate is disposed between the open end 9 of the inner cylinder 6, and the guide member 14 and the damping force generating annular member 30. The annular stop 38 is adapted to be sheared thereby permitting the damping force generating member 30 to be detached from the guide member 14 in the direction A when a force exceeding a predetermined magnitude is exerted in the direction A on the annular member 30. The annular stop 38 is made, for example, of high tensile strength steel. The annular stop 38 is supported at the outer periphery 39a of one annular surface 39 by the annular end face 40 on the open end 9 of the inner cylinder 6 and at the outer periphery 41a of the other annular face 41 by the end face 37 of the guide member 14. At the same time, the annular stop 38 abuts at the inner periphery 41b of its annular face 41 against the annular end face 36 of the damping force generating member 30 to retain or support the member 30.

When an impact shock F is applied in the direction B to the inner cylinder 6, the inner cylinder 6 advances in the direction B within the outer cylinder 5, in which the hydraulic fluid enters by the amount represented by the product of the advancing distance C of the inner cylinder 6 and the cross section $\pi D^2/4$ corresponding to the inner diameter D of the outer cylinder 5 from the chamber 24 through the orifice 33 into the chamber 21 against the flow resistance of the orifice 33 to displace the free piston 18 in the direction A. As a result of the resistive force exerted to the flow of the fluid in the orifice 33, a force E is exerted to the damping force generating member 30 in the direction A. In the case where the force E is smaller than a predetermined magnitude that is, if the force F is within a predetermined range, the damping force generating member 30 is inhibited to be detached from the guide member 14 in the direction A by the annular stop 38.

On the contrary, if the force E exceeds the predetermined level or magnitude, the annular member 30 can no more be retained by the annular stop 38 and is detached from the guide member 14 in the direction A, since the inner periphery 38a of the annular stop 38 is sheared to be destructed by the force E applied to the damping force generating annular member 30. As the result, the chamber 24 and the chamber 21 communicates through the hole 29 which is greater than the orifice 33, in which the resistive force to the flow of the fluid from the chamber 24 to the chamber 21 decreases and the impact shock F is moderated.

In the above-mentioned embodiment, it is designed such that the diameter D1 of the aperture 42 in the annular stop 38 is greater than the diameter D2 of the orifice 33 so that the flow of the fluid passing through the orifice 33 may not be hindered by the annular stop 38, the outer diameter D3 of the annular member 30 is greater than the diameter D1 of the aperture 42 in the annular stop 38 so that the inner periphery 38a of the annular stop 38 can be sheared to be destructed by the damping force generating annular member 30 and, further, the outer diameter D3 of the damping force generating annular member 30 is smaller than the inner diameter D4 of the inner cylinder 6 so that the annular member 30 can shear the annular stop 38 and can be detached from the guide member 14.

The cross section of the hole 29 is not necessarily be circular provided that the hole 29 has an adequate shape for fitting to the outer circumference of the annular member 30 and that the dimension or length of the hole 29 in the radial direction of the inner cylinder 6 is smaller than the inner diameter D4 of the inner cylinder 6 and greater than the diameter D1 of the aperture 42 in the annular stop 38. Further, so long as the inner periphery 38a of the annular stop 38 is so positioned as abutting against the end face 36 of the annular member 30 so that it does not hinder the flow of the hydraulic fluid from the chamber 24 to the chamber 21 and can support the annular member 30, the cross section of the aperture 42 in the annular stop 38 is not necessarily circular, but notches extended radially in terms of the inner cylinder 6 may be provided to the annular stop 38. Further, the protrusion 31 for holding the annular member 30 cooperatively with the annular stop 38 may not always be annular.

As the inner cylinder 6 advances in the direction B, the advancing speed of the inner cylinder 6 in that direction may be decreased, which results in the reduction of the resistive force in the orifice 33 substantially in proportion to the square of the advancing speed. In order to avoid such disadvantage, a metering pin 46 is further provided, which is secured at its base portion 44 to the end wall 43 formed by the cap member 2 of the outer cylinder 5, extended passing through the chamber 24 of the outer cylinder 5 axially and facing at its extended end 45 to the orifice 31. The metering pin 46 is tapered convergingly from the base 44 to the end 45 so that the gap 47 between the metering pin 46 and the orifice 33, that is, the flow passage of the hydraulic fluid from the chamber 24 to the chamber 21 is restricted more as the metering pin 46 enters into the orifice 33 more deeply.

Upon exertion of the impact shock F on the inner cylinder 6, since the inner cylinder 6 is displaced in the direction B against the flow resistance of the hydraulic fluid in the gap 47, the advancing speed of the inner cylinder 6 in the direction B is decreased as the inner cylinder 6 is displaced in that direction. Since the gap 47 is gradually decreased, however, the substantial reduction in the flow resistance can be avoided. Specifically, by using the metering pin 46 of an adequate shape, the flow resistance to the hydraulic fluid in the gap 47, that is, the damping force exerted on the inner cylinder 6 can be maintained substantially constant irrespective of the advancing position of the inner cylinder 6, so long as to the impact shock F is within a certain range.

In the case of applying the shock absorber 48 having the foregoing constitutions for the gradual damping of the impact shock exerted upon collision of vehicles such as passenger cars or trucks, the shock absorber 48 is situated laterally, with a fitting 49 integrally formed with the cap member 2 being attached to the chassis of a vehicle and a fitting 50 integrally formed with the cap member 8 being attached to the bumper of the vehicle.

In the case where the shock absorber 48 is applied for gradually damping the impact shock upon falling of lifts and the likes, the shock absorber is located vertically as shown in the drawings. The free piston 18 can be omitted in this case and the free surface of the hydraulic fluid in the chamber 19 within the inner cylinder 6 may be in direct contact with inert gas such as nitrogen gas.

The shock absorber 48 is assembled in the following manners. At first, the damping force generating annular member 30 is fitted into the penetrating hole 29 in the guide member 14 to abut the annular end face 35 of the annular member 30 against the annular protrusion 31. Then, while locating the annular stop 38 in abutment with the annular end face 36 of the annular member 30, the annular outer periphery 28 of the guide member 14 is fitted to the open end 9 of the inner cylinder 6, and the outer periphery 28 of the guide member 14 is welded to the outer circumference 27 of the inner cylinder 6. After the securing of the piston 14a comprising the guide member 14, the annular member 30 and the stop 38 to the open end 9, the inner cylinder 6 is fitted into the outer cylinder 5. The piston 14a can thus be assembled with ease. Other assembling procedures can be done in the same manners as those in conventional shock absorbers. In assembling the shock absorber 48, no cracks, chippings nor remarkable distortions are resulted in the components such as the guide member 14, the annular member 30 and the stop 38.

In using the shock absorber 48, fittings 49 and 50 thereof are attached, for example, to the chassis and the bumper of the vehicle. When a designed impact shock F1 determined by the area of the gap 47 or the orifice 33 of the damping force generating annular member 30 and the outer diameters of the metering pin 46 is exerted in the direction B on the inner cylinder 6 through the fitting 50 of the shock absorber 48, the inner cylinder 6 intrudes into the chamber 24 in the direction B, by which the hydraulic fluid in the chamber 24 flows through the gap 47 between the circumference of the orifice 33 of the annular member 30 and the metering pin 46 against the flow resistance in the gap 47 and enters into the chamber 21 while displacing the free piston 18 in the direction A. Since the inner cylinder 6 advances in the direction B against the force E1 corresponding to the above flow resistance, the impact shock F1 is moderated and applied, as the force substantially corresponding to the force E1 to the chassis (assuming that the increase in the gas pressure within the chamber 20 is negligible). The impact shock energy that generates the impact shock F1 is gradually exhausted in the work effected by the inner cylinder 6 and the impact shock F1 is gradually damped.

In the case if an impact shock F2 greater than the designed impact shock F1 is exerted in the direction B on the inner cylinder 6 of the shock absorber 48 the force E which is exerted on the inner periphery 38a of the stop 38 by the annular member 30 becomes larger than a predetermined magnitude, and the annular stop 38 is sheared at its inner periphery 38a substantially in a circular shape by the annular member 30 allowing the annular member 30 to be detached from the guide member 14. As the result, since the passage for the hydraulic fluid from the chamber 24 to the chamber 21 is enlarged to maintain the flow resistance to the hydraulic fluid relatively low even if the advancing speed of the inner cylinder 6 in the direction B is great, the hydraulic shock absorber 48 does not act as a rigid body but can moderate the impact shock F2.

Since no cracks, chipping nor remarkable distortions are resulted in the components such as the guide member 14, the annular member 30 and the stop 38 in the shock absorber 48 in its not-operated state, the stop 38 can surely be sheared by the shearing load as designed. Consequently, the shock absorber 48 can reliably moderate the impact shock irrespective of the magnitudes thereof. Although the shearing load for the annular stop 38 can be adjusted by the changes in the inner diameter at the open end 9 of the inner cylinder 6, and the inner diameter and the outer diameter of the annular member 30, the shearing load can also be adjusted with ease by the changes in the inner diameter of the stop 38 and the shape of the inner periphery 38a of the stop 38 while maintaining the dimension of the inner cylinder and the annular member unchanged.

FIG. 2 shows a part of a shock absorber 51 as a modified embodiment of this invention. In the shock absorber 51, are provided as back-up members a flat annular plate 52 between a stop 38 and the open end 9 of an inner cylinder 6 and a flat annular plate 53 between the stop 38 and the damping force generating annular member 30 in addition to the stop 38. The outer diameter of the annular plate 52 is the same as the outer diameter of the stop 38, and the annular faces 54, 55 of the annular plate 52 are abutted against the annular face 40 on the open end 9 of the inner cylinder 6 and the annular face 39 of the stop 38 respectively. The inner diameter D5 of the annular plate 52 is slightly larger than the diameter D3 of the penetrating hole 29 in a guide member 14. The outer diameter of the annular plate 53 is substantially the same as the diameter D3 of the hole 28 in the guide member 14, and the annular plate 53 is inserted in the hole 29 so as to abut at its one annular face 56 against the annular end face 36 of the damping force generating annular member 30. The outer annular face 57 of the annular plate 53 is in a coplanar relation with the annular face 37 of the annular main body 26 of the guide member 14 and the annular face 57 is abutted against the annular face 41 of the stop 38 on the inner periphery 38a. The inner diameter D6 of the annular plate 53 is slightly smaller than the inner diameter D1 of the stop 38. The annular plates 52, 53 are made, for example, of high tensile strength steels and situated on both sides of the annular stop 38 for fixing the annular member 30.

In the shock absorber 51 having the foregoing constitutions, the shearing destruction in the inner periphery 38a of the annular stop 38 is caused, directly, by the annular plate 52, 53 when an impact shock exceeding a designed value is exerted on the inner cylinder 6. Consequently, there is no possibility of causing cracks or chippings in the guide member 14 and the damping force generating annular member 30 upon shearing of the stop 38. Moreover, there is little fear that such cracks or chippings may be produced in the guide member 14 and the annular member 30, or that cracks, chippings or remarkable strains or distortions may be produced in the stop 38 upon mounting the stop 38 in the shock absorber 51, different from the conventional shock absorbers using shearing pins. As the result, scatterings or uncontrollable variations in the value of the loads for the stop 38 to be sheared can be prevented, which may be unavoidable in the case where there are cracks or chippings in the guide member 14, the annular member 30 and the stop 38, or where there are distortions in the stop 38. Thus, in the case where a designed impact shock for shearing the stop 38 is exerted on the shock absorber 51, the stop 38 can surely be sheared and the excessive impact shock can also be absorbed reliably by the shock absorber 51.

Both of the stop 38 and the plate 52 may be formed integrally, both of the stop 38 and the plate 53 may be formed integrally, and all of the stop 38 and the plates 52, 53 may be formed integrally.

What is claimed is:

1. A shock absorber, comprising:
    a hollow outer cylinder having an open and a closed end;
    a hollow inner cylinder having an open and a closed end, the open end thereof being inserted into the open end of the outer cylinder;
    a guide member for guiding the inner cylinder slidably in the outer cylinder in the axial direction of the cylinders;
    a first annular plate having a first annular surface and an opposing second annular surface, said first annular plate being abutted against the open end of said inner cylinder at the first surface thereof;
    a shearable stop plate in the form of an annulus, said stop plate having a first annular surface and an opposing second annular surface, and being abutted against an inner periphery of the second surface of the first annular plate at an outer periphery of the first surface thereof;
    a second annular plate having a first annular surface and an opposing second annular surface, said second annular plate having a slightly smaller outer diameter than the inner diameter of said first annular plate, and being abutted against an inner periphery of the second surface of the stop plate at an outer periphery of the first surface thereof;
    a cylindrical damping force generating member for generating a damping force, said damping force generating member having a first end face abutted against the second surface of said second annular plate, a second end face opposing the first end face, and an axially penetrating orifice at a radially central portion thereof so as to throttle the flow of hydraulic fluid from a chamber in the outer cylinder to a chamber in the inner cylinder, the penetrating orifice of the damping force generating member being smaller than apertures of said first and second annular plates and of said stop plate; and
    a tubular supporting member fixed to the inner cylinder near the open end thereof, said supporting member presenting an axial bore penetrating said supporting member and adapted for receiving said damping force generating member and said second annular plate therewithin, such that said damping force generating member and said second annular plate may be axially guided toward said stop plate, and said supporting member having an annular end face at its inner periphery abutted against the outer periphery of the second surface of said stop plate so as to hold an outer periphery of said stop plate in cooperation with said first annular plate, such that the stop plate is adapted in such a manner that, when an impact shock given to the shock absorber to contract it is not greater than a predetermined magnitude, the stop plate retains the damping force generating member in the axial bore of the supporting member at the inner periphery of the second surface of said stop plate against a force not greater than a predetermined magnitude axially exerted to the damping force generating member in response to the shock, and that, when an impact shock given to the shock absorber to contract it is greater than the predetermined magnitude, the stop plate is sheared off in a generally circular shape at a portion between the held outer periphery which is supported by said first annular plate at the first face of the stop plate and an inner periphery by a force greater than the predetermined magnitude axially exerted on the inner periphery of the second surface of said stop plate from the damping force generating member through said second annular plate in response to the shock, such that the damping force generating member is detached from the axial bore of the supporting member and moved into the inner cylinder permitting the hydraulic fluid in the chamber of the outer cylinder to flow substantially freely into the chamber of the inner cylinder through the penetrating bore of the supporting member.

2. The shock absorber of claim 1, in which said first and second annular plates are made from high tensile strength steel.

3. The shock absorber of claim 1 or 2, in which said first annular plate is abutted against an open end face of said inner cylinder at an outer periphery of the first surface thereof.

4. The shock absorber of claim 3, which further comprises a free piston slidably fitted in the inner cylinder so as to divide the chamber in the inner cylinder into a gas chamber and a hydraulic fluid chamber which is in communication with the chamber in the outer-cylinder.

5. The shock absorber of claim 4, in which the guide member is formed integrally with the supporting member.

6. The shock absorber of claim 5, in which the supporting member has an annular protrusion extending from the outer periphery of the annular end face thereof in the axial direction of the closed end of the inner cylinder, said protrusion being welded to the outer circumferential face of the inner cylinder.

7. The shock absorber of claim 3, which further comprises a metering pin extended axially from the closed end of the outer cylinder to the orifice of said damping force generating member and being capable of controlling the resistance to the flow of the hydraulic fluid by its position relative to the orifice of said damping force generating member.

8. The shock absorber of claim 7, in which the metering pin tapers to the extended end.

9. The shock absorber of claim 8, in which the guide member is formed integrally with the supporting member.

10. The shock absorber of claim 9, in which the supporting member has an annular protrusion extending from the outer periphery of the annular end face thereof in the axial direction of the closed end of the inner cylinder, said protrusion being welded to the outer circumferential face of the inner cylinder.

11. The shock absorber of claim 3 in which the supporting member has an inward radial protrusion which abutts against said second end face of the damping force generating member to prevent the damping force generating member from being detached from the axial bore of the supporting member toward the closed end of the outer cylinder.

12. The shock absorber of claim 11, in which the inward radial protrusion is an annular protrusion.

13. The shock absorber of claim 11, which further comprises a free piston slidably fitted in the inner cylinder so as to divide the chamber in the inner cylinder into a gas chamber and a hydraulic fluid chamber in communication with the chamber in the outer cylinder.

14. The shock absorber of claim 13, in which the guide member is formed integrally with the supporting member.

15. The shock absorber of claim 14, in which the supporting member has an annular protrusion extending from the outer periphery of the annular end face thereof in the axial direction of the closed end of the inner cylinder said protrusion being welded to the outer circumferential face of the inner cylinder.

16. The shock absorber of claim 11, which further comprises a metering pin extended axially from the closed end of the outer cylinder to the orifice of said damping force generating member and being capable of controlling the resistance to the flow of the hydraulic fluid by its position relative to the orifice of said damping force generating member.

17. The shock absorber of claim 16, in which the metering pin tapers to the extended end.

18. The shock absorber of claim 17, in which the guide member is formed integrally with the supporting member.

19. The shock absorber of claim 18, in which the supporting member has an annular protrusion extending from the outer periphery of the annular end face thereof in the axial direction of the closed end of the inner cylinder, said protrusion being welded to the outer circumferential face of the inner cylinder.

20. The shock absorber of claim 3, in which the guide member is formed integrally with the supporting member.

21. The shock absorber of claim 20, in which the supporting member has an annular protrusion extending from the outer periphery of the annular end face thereof in the axial direction of the closed end of the inner cylinder, said protrusion being welded to the outer circumferential face of the inner cylinder.

* * * * *